United States Patent
Kashima et al.

(10) Patent No.: US 10,155,220 B2
(45) Date of Patent: Dec. 18, 2018

(54) TITANIUM OXIDE PARTICLE, COMPOSITION FOR FORMING PHOTOCATALYST, AND PHOTOCATALYST

(71) Applicant: FUJI XEROX CO., LTD., Tokyo (JP)

(72) Inventors: Yasunobu Kashima, Kanagawa (JP); Hiroyoshi Okuno, Kanagawa (JP); Hideaki Yoshikawa, Kanagawa (JP); Takeshi Iwanaga, Kanagawa (JP); Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/491,030

(22) Filed: Apr. 19, 2017

(65) Prior Publication Data

US 2018/0161765 A1  Jun. 14, 2018

(30) Foreign Application Priority Data

Dec. 12, 2016  (JP) .................. 2016-240461

(51) Int. Cl.

| | | |
|---|---|---|
| *B01J 21/18* | (2006.01) | |
| *B01J 35/00* | (2006.01) | |
| *B01J 21/06* | (2006.01) | |
| *B01J 31/02* | (2006.01) | |
| *B01J 31/14* | (2006.01) | |

(52) U.S. Cl.
CPC ........... *B01J 35/004* (2013.01); *B01J 21/063* (2013.01); *B01J 31/0274* (2013.01); *B01J 31/143* (2013.01)

(58) Field of Classification Search
CPC .... B01J 35/004; B01J 21/063; B01J 31/0274; B01J 31/143
USPC ..... 502/154, 158, 350, 180, 182; 423/445 R, 423/447.2
See application file for complete search history.

(56) References Cited

U.S. PATENT DOCUMENTS

| | | | |
|---|---|---|---|
| 5,411,761 A | 5/1995 | Inokuchi et al. | |
| 6,235,270 B1 | 5/2001 | Ishii et al. | |
| 7,090,823 B1 * | 8/2006 | Liu | C01G 23/00 423/610 |
| 7,211,543 B2 * | 5/2007 | Nakabayash | B01J 21/063 502/150 |
| 7,959,980 B2 * | 6/2011 | Nakajima | C09D 5/1618 106/436 |
| 2004/0248075 A1 * | 12/2004 | Yamaguchi | A61L 2/0011 435/2 |
| 2006/0009351 A1 | 1/2006 | Iwamoto et al. | |
| 2006/0162617 A1 * | 7/2006 | Tanaka | B01J 35/004 106/436 |
| 2007/0248831 A1 * | 10/2007 | Nishihara | B01J 21/063 428/457 |
| 2008/0268268 A1 * | 10/2008 | Masaki | B01J 23/18 428/469 |
| 2010/0279118 A1 * | 11/2010 | Hempenius | B82Y 30/00 428/402.22 |
| 2011/0159109 A1 * | 6/2011 | Lee | A61L 2/232 424/618 |
| 2012/0122668 A1 * | 5/2012 | Celiker | B01J 21/063 502/242 |
| 2013/0164444 A1 * | 6/2013 | Tokumitsu | C01G 23/053 427/219 |
| 2017/0218204 A1 * | 8/2017 | Edwards | C09B 31/053 |

FOREIGN PATENT DOCUMENTS

| | | |
|---|---|---|
| JP | 5-221640 A | 8/1993 |
| JP | 2001-269573 A | 10/2001 |
| JP | 2004-115541 A | 4/2004 |
| JP | 2006-21112 A | 1/2006 |
| JP | 2007-16111 A | 1/2007 |
| JP | 2008-212841 A | 9/2008 |
| JP | 2010-6629 A | 1/2010 |
| JP | 2013-249229 A | 12/2013 |
| JP | 2014-128768 A | 7/2014 |
| JP | 2014-188417 A | 10/2014 |

* cited by examiner

*Primary Examiner* — Patricia L. Hailey
(74) *Attorney, Agent, or Firm* — Sughrue Mion, PLLC

(57) ABSTRACT

A titanium oxide particle includes bonded thereon a metal-containing compound which has a hydrocarbon group, wherein the titanium oxide particle has an absorption at 450 nm and 750 nm in a visible absorption spectrum, and with respect to a surface of the particle, an element ratio M/Ti between metal M of the metal-containing compound and titanium is from 0.1 to 0.4 and an element ratio C/Ti between carbon C and titanium is from 0.3 to 1.2.

19 Claims, No Drawings

TITANIUM OXIDE PARTICLE, COMPOSITION FOR FORMING PHOTOCATALYST, AND PHOTOCATALYST

CROSS-REFERENCE TO RELATED APPLICATIONS

This application is based on and claims priority under 35 USC 119 from Japanese Patent Application No. 2016-240461 filed Dec. 12, 2016.

BACKGROUND

Technical Field

The present invention relates to a titanium oxide particle, a composition for forming a photocatalyst, and a photocatalyst.

SUMMARY

According to an aspect of the invention, there is provided a titanium oxide particle including bonded thereon a metal-containing compound which has a hydrocarbon group, wherein the titanium oxide particle has an absorption at 450 nm and 750 nm is a visible absorption spectrum, and with respect to a surface of the particle, an element ratio M/Ti between metal M of the metal-containing compound and titanium is from 0.1 to 0.4 and an element ratio C/Ti between carbon C and titanium is from 0.3 to 1.2.

DETAILED DESCRIPTION

Hereinafter, an exemplary embodiment which is an example of the invention will be described.

<Titanium Oxide Particle>

A titanium oxide particle according to an exemplary embodiment subjected to surface treatment with a metal-containing compound having a hydrocarbon group. The titanium oxide particle absorbs light having wavelengths of 450 nm and 750 nm in a visible absorption spectrum. With respect to the surface of the particle, the element ratio M/Ti between metal M of the metal-containing compound and titanium is from 0.1 to 0.4, and the element ratio C/Ti between carbon C and titanium is from 0.3 to 1.2.

The titanium oxide particle according to the exemplary embodiment is suitably used as a photocatalyst.

The titanium oxide particle according to the exemplary embodiment has the above configuration, and thus shows a high photocatalyst function even in the visible light region. The reason is estimated as follows.

Firstly, generally, an untreated titanium oxide particle as a photocatalyst absorbs ultraviolet rays, and thus shows a photocatalyst function (photocatalyst activation). Thus, an untreated titanium oxide particle has a tendency to enable showing of the photocatalyst function during a daytime on a sunny day on which sufficient ultraviolet rays may be secured, but ultraviolet rays are insufficiently secured and the function is deteriorated during a night-time or in the shade. For example, in a case where an untreated titanium oxide particle is used as an exterior wall material, a difference in strain resistance may occur in accordance with a sunny place and a shade place. In a case where an untreated titanium oxide particle is used in an air cleaner, a water purifier, or the like, an additional mounting space, for example, in which a black light and the like which function as a light source of an ultraviolet ray is mounted in the device may be required.

Recently, titanium oxide particles which show the photocatalyst function (photocatalyst activation) by absorbing visible light are also known. For example, as such a visible light-absorption type titanium oxide particle, a titanium oxide particle obtained by adhering a different type of metal (iron, copper, tungsten, and the like) to titanium oxide, a titanium oxide particle obtained by doping a nitrogen element, a sulfur element, and the like are known.

However, the photocatalyst function regarding absorption of visible light is not sufficiently shown yet, and a titanium oxide particle which shows a high photocatalyst function even in a visible light region is required.

Regarding this, a titanium oxide particle subjected to surface treatment with a metal-containing compound having a hydrocarbon group is provided. In the titanium oxide particle, light having wavelengths of 450 nm and 750 nm in a visible absorption spectrum is absorbed, an element ratio M/Ti between metal M of the metal-containing compound and titanium on the surface thereof is from 0.1 to 0.4, and an element ratio C/Ti between carbon C and titanium is from 0.3 to 1.2.

The titanium oxide particle which satisfies the respect the element ratios has a C/Ti element ratio lower than a numerical range of the M/Ti element ratio, in comparison to that of a general titanium oxide particle subjected to surface treatment with a silane compound having a hydrocarbon group.

The M/Ti element ratio is 0.1 to 0.4 on the surface of the titanium oxide particle, and thus the quantity of particles subjected to surface treatment with the metal-containing compound is adequate, light having wavelengths of 450 nm and 750 nm is sufficiently absorbed, and the high photocatalyst function is shown in the visible light region.

If the M/Ti element ratio is less than 0.1, an amount of the surface of the titanium oxide particle coated with the metal-containing compound small. Thus, sufficient absorption at wavelengths of 450 nm and 750 nm is not obtained, and the photocatalyst function in the visible light region is deteriorated. If the Si/Ti element ratio is more than 0.4, the amount of the surface of the titanium oxide particle coated with the metal-containing compound is large, and an exposed amount of a portion at which titanium oxide is activated in the titanium oxide particle reduced. Thus, the photocatalyst function in the visible light region is deteriorated.

The C/Ti element ratio on the surface of the titanium oxide particle is from 0.3 to 1.2, and thus an amount of carbon in the hydrocarbon group and the like on the surface of the titanium oxide particle is adequate. Light having wavelengths of 450 nm and 750 nm is sufficiently absorbed, and the high photocatalyst function is shown in the visible light region.

If the C/Ti element ratio is less than 0.3, the amount of carbon on the surface of the titanium oxide particle is small. Thus, sufficient absorption at wavelengths of 450 nm and 750 nm is not obtained, and the photocatalyst function in the visible light region is deteriorated. If the C/Ti element ratio is more than 1.2, the amount of hydrocarbon groups on the surface of the titanium oxide particle is large. Thus, exposed amount of a portion at which titanium oxide is activated on the surface of the titanium oxide particle is reduced, and a case where the hydrocarbon group is decomposed by the photocatalyst function also occurs. Accordingly, the photocatalyst function in the visible light region is deteriorated.

Hitherto, with the above configuration, it is estimated that the titanium oxide particle according to the exemplary embodiment shows the high photocatalyst function even in the visible light region.

For example, regarding a titanium oxide particle which satisfies each of the element ratios and methanol hydrophobicity, a titanium oxide particle subjected to surface treatment with a metal-containing compound having a hydrocarbon group is prepared in a manner that some of the hydrocarbon groups are oxidized and decomposed by treatment such as heating. Regarding such a titanium oxide particle, it is considered that hydrocarbon and carbon obtained by carbonizing hydrocarbon are provided in a pore of the titanium oxide particle, that is, hydrocarbon and carbon obtained by carbonizing hydrocarbon are buried from the surface layer over the inside of the titanium oxide particle.

It is considered that the buried carbon functions as a charge separation material, and thus the photocatalyst function is shown. It is considered that the carbon operates an optical charge separation function even by absorbing visible light along with ultraviolet light, and thus the photocatalyst function is shown. This represents that the titanium oxide particle absorbs light having wavelengths of 450 nm and 750 nm in the ultraviolet-visible absorption spectrum. Further, carbon as the charge separation material has a function of accelerating separation of charges generated by absorbing light, and also acts as a promotor.

That is, the followings are considered. Carbon provided in a pore of the titanium oxide particle performs an action of selectively capturing electrons, by absorbing visible light along with ultraviolet light. Thus, carbon as the charge separation material causes probability of recombining electrons and holes of the titanium oxide particle, which are excited, by absorbing light to be reduced. The carbon effectively accelerates separation of charges, and this acceleration of separation of charges causes the photocatalyst function to be improved.

Generally, an untreated titanium oxide particle has a tendency of a low degree of freely controlling a particle diameter, particle diameter distribution, and a shape of a particle, and has a tendency of high particle aggregation. Thus, in resin, dispersibility of titanium oxide particles in a liquid is deteriorated, and there is a tendency that (1) showing of the photocatalyst function is difficult and (2) transparency of a film and the like and uniformity of a coated film of a coating liquid are easily deteriorated.

However, since the titanium oxide particle according to the exemplary embodiment has a hydrocarbon group on the surface thereof, dispersibility of primary particles in a coated film is also secured. Thus, a coated film may be substantially uniformly formed, and light hits the titanium oxide particle with high efficiency, and thus the photocatalyst function is easily shown. Transparency of a film and the like, uniformity of a coated film of a coating liquid, and high design properties are held together. As a result, for example, when a coating material containing the titanium oxide particle is applied onto the surface of an outer wall material, a plate, a pipe, or nonwoven fabric (non-woven fabric of ceramic and the like), aggregation of titanium, oxide particles and an occurrence of coating defects are prevented, and the photocatalyst function is easily shown for a long term.

Details of the titanium oxide particle according to the exemplary embodiment will be described below.

Untreated Titanium Oxide Particle

Examples or an untreated titanium oxide particle (titanium oxide particle as a target of surface treatment) include particles of titanium oxide of a brookite type, an anatase type, a rutile type, and the like. The titanium oxide particle may have a single crystal structure of brookite, anatase, rutile, and the like or may have a mixed crystal structure in which the above crystals are provided together.

The untreated titanium oxide particle according to the exemplary embodiment is a titanium oxide particle which is not subjected to surface treatment with a metal-containing compound having a hydrocarbon group. The surface treatment may include any type of surface treatment. However, it is preferable that the titanium oxide particle according to the exemplary embodiment is a titanium oxide particle subjected to surface treatment with only a metal-containing compound having a hydrocarbon group.

A preparing method of the untreated titanium oxide particle is not particularly limited. However, a chlorine method (vapor phase method), and a sulfuric acid method (liquid phase method) are exemplified.

An example of the chlorine method (vapor phase method) is as follows. Firstly, rutile ore which is a raw material is caused to react with coke and chlorine. After the reactant is exposed to gaseous titanium tetrachloride once, cooling is performed, thereby a titanium tetrachloride liquid is obtained. Then, obtained titanium tetrachloride liquid is caused to react with oxygen at a high temperature, and then a chlorine gas is separated. Thus, an untreated titanium oxide is obtained.

An example of the sulfuric acid method (liquid phase method) is as follows. Firstly, ilmenite ore ($FeTiO_3$) or titanium slag which is a raw material is dissolved in concentrated sulfuric acid, and an iron component which is an impurity is separated in a form of iron sulfate ($FeSO_4$), thereby titanium oxysulfate ($TiOSO_4$) is obtained. Then, titanium oxysulfate ($TiOSO_4$) is subjected to hydrolysis, and thus is precipitated in a form of titanium oxyhydroxide ($TiO(OH)_2$). This precipitate is washed and dried, and a dried matter is baked. Thus, an untreated titanium oxide is obtained.

As a method of preparing an untreated titanium oxide particle, additionally, a sol-gel method using titanium alkoxide and a method of baking metatitanic acid are provided. Regarding a crystal structure of the titanium oxide particle, the crystal structure is changed to brookite, anatase, or rutile by a baking temperature (for example, heating in a range of 400° C. to 1,200° C.). Thus, an untreated titanium oxide particle having a desired crystal structure is obtained by the baking temperature.

(Metal-Containing Compound)

The metal-containing compound has a hydrocarbon group. As a hydrocarbon group included in the metal-containing compound, an aliphatic hydrocarbon group or an aromatic hydrocarbon group which has 1 to 20 carbon atoms (preferably 1 to 18 carbon atoms, more preferably 4 to 12 carbon atoms, and further preferably 4 to 10 carbon atoms) and is saturated or unsaturated is exemplified.

The hydrocarbon group may or may not be directly combined to metal in the metal-containing compound. However, from a viewpoint of showing a high photocatalyst function and improving dispersibility, the hydrocarbon group is preferably directly combined.

As metal of the metal-containing compound having the hydrocarbon group, a metal atom selected from the group consisting of silicon and aluminum is preferable, and silicon is particularly preferable. That is, as the metal-containing compound having a hydrocarbon group, a silane compound having a hydrocarbon group is particularly preferable.

Examples of the silane compound include a chlorosilane compound, an alkoxysilane compound, a silazane compound (hexamethyldisilazane and the like).

Among these substances, from a viewpoint of showing high photocatalyst function and improving dispersiblity, a compound represented by a formula of $R^1{}_n SiR^2{}_m$ is preferable as the silane compound.

In the formula of $R^1{}_n SiR^2{}_m$, $R^1$ represents an aliphatic hydrocarbon group or an aromatic hydrocarbon group which has 1 to 20 carbon atoms and is saturated or unsaturated, $R^2$ represents a halogen atom or an alkoxy group, n represents an integer of 1 to 3, and m represents an integer of 1 to 3, provided that n+m=4 is satisfied. In a case where n represents an integer of 2 or 3, plural $R^1$s may be the same or different. In a case where m represents an integer of 2 or 3, plural $R^2$s may be the same or different.

The aliphatic hydrocarbon group represented by $R^1$ may have any of a straight chain shape, a branched chain shape, and a ring shape. However, from a viewpoint of dispersiblity, a straight chain shape or a branched chain shape s preferable, and a straight chain shape is more preferable. From a viewpoint of showing a high photocatalyst function and improving dispersibility, the aliphatic hydrocarbon group has preferably from 1 to 18 carbon atoms, more preferably from 4 to 12 carbon atoms, and further preferably from 4 to 10 carbon atoms. The aliphatic hydrocarbon group may be a saturated or unsaturated aliphatic hydrocarbon group. However, from a viewpoint of showing a high photocatalyst function and improving dispersibility, a saturated aliphatic hydrocarbon group is preferable, and an alkyl group is more preferable.

Examples of the saturated aliphatic hydrocarbon group include a straight-chain alkyl group (a methyl group, an ethyl group, a propyl group, a butyl group, a pentyl group, a hexyl group, a heptyl group, an octyl group, a nonyl group, a decyl group, a dodecyl group, a hexadecyl group, an icosyl group, and the like); a branched chain alkyl group (an isopropyl group, an isobutyl group, an isopentyl group, a neopentyl group, a 2-ethylhexyl group, a tertiary butyl group, a tertiary pentyl group, an isopentadecyl group, and the like); and a cyclic alkyl group (a cyclopropyl group, a cyclopentyl group, a cyclohexyl group, a cycloheptyl group, a cyclooctyl group, a tricyclodecyl group, a norbornyl group, an adamantyl group, and the like).

Examples of the unsaturated aliphatic hydrocarbon group include an alkenyl group (a vinyl group (ethenyl group), a 1-propenyl group, a 2-propenyl group, a 2-butenyl group, a 1-butenyl group, a 1-hexenyl group, a 2-dodecenyl group, a pentenyl group, and the like); and an alkynyl group (an ethynyl group, a 1-propynyl group, a 2-propynyl group, a 1-butynyl group, a 3-hexynyl group, a 2-dodecynyl group, and the like).

The aliphatic hydrocarbon group also includes a substituted aliphatic hydrocarbon group. Examples of a substituent which may be substituted with the aliphatic hydrocarbon group include an epoxy group, a mercapto group, a methacryloyl group, and an acryloyl group.

As the aromatic hydrocarbon group represented by $R^1$, an aromatic hydrocarbon group having 6 to 27 carbon atoms (preferably 6 to 18) is exemplified.

Examples of the aromatic hydrocarbon group include a phenylene group, a biphenylene group, a terphenylene group, a naphthalene group, and an anthracene group.

The aromatic hydrocarbon group also includes a substituted aromatic hydrocarbon group. Examples of a substituent which may be substituted with the aromatic hydrocarbon group include an epoxy group, a glycidyl group, a mercapto group, a methacryloyl group, and an acryloyl group.

Examples of the halogen atom represented by $R^2$ include a fluorine atom, a chlorine atom, a bromine atom, and an iodine atom. Among these atoms, as the halogen atom, a chlorine atom, a bromine atom, or an iodine atom is preferable.

Examples of the alkoxy group represented by $R^2$ include an alkoxy group having 1 to 10 carbon atoms (preferably 1 to 8, and more preferably 3 to 8).

Examples of the alkoxy group include a methoxy group, an ethoxy group, an isopropoxy group, a t-butoxy group, a n-butoxy group, a n-hexyloxy group, a 2-ethylhexyloxy group, and a 3,5,5-trimethylhexyloxy group.

The alkoxy group also includes a substituted alkoxy group. Examples of a substituent which may be substituted with the alkoxy group include a halogen atom, a hydroxyl group, an amino group, an alkoxy group, an amide group, and a carbonyl group.

As the compound represented by the formula of $R^1{}_n SiR^2{}_m$, a compound in which $R^1$ represents a saturated hydrocarbon group is preferable from a viewpoint of showing a high photocatalyst function and improving dispersibility. In particular, as the compound represented by the formula of $R^1{}_n SiR^2{}_m$, a compound in which $R^1$ represents a saturated aliphatic hydrocarbon group having 1 to 20 carbon atoms, $R^2$ represents a halogen atom or an alkoxy group, n represents an integer of 1 to 3, and m represents an integer of 1 to 3 (n+m=4 is satisfied) is preferable.

Specific examples of the compound represented by the formula of $R^1{}_n SiR^2{}_m$ include vinyltrimethoxysilane, propyl trimethoxysilane, i-butyltrimethoxysilane, n-butyltrimethoxysilane, n-hexyltrimethoxysilane, n-octyitrimethoxysilane, n-dodecyltriethoxysiiane, phenyltrimethoxysilane, 3-glycidoxypropyltrimethoxysilane, tetramethoxysilane, methyltrimethoxysilane, dimethyl dimethoxysilane, diphenyldimethoxysilane, o-methylphenyltrimethoxysilane, p-methylphenyitrimethoxysilane, decyitrimethoxysilane, dodecyltrimethoxysilane, tetraethoxysilane, methyl triethoxysilane, dimethyldiethoxysilane, phenyitriethoxysilane, diphenyldimethoxysilane, i-butyltriethoxysilane, decyltriethoxysilane, vinyl triethoxysilane, γ-methacryloxypropyltrimethoxysilane, γ-glycidyloxypropylmethyldimethoxysilane γ-mercaptopropyltrimethoxysilane, γ-chloropropyltrimethoxysilane, γ-aminopropyltrimethoxysilane, γ-aminopropyltriethoxysilane, γ-(2-aminoethyl) aminopropyltrimethoxysilane, and γ-(2-aminoethyl) aminopropylmethyldimethoxysilane.

The silane compound may be singly used or may be used in combination of two types or more.

Among these substances, from a viewpoint of showing a high photocatalyst function and improving dispersiblity, the hydrocarbon group in the silane compound is preferably an aliphatic hydrocarbon group, more preferably a saturated aliphatic hydrocarbon group, and particularly preferably an alkyl group.

From a viewpoint of showing a high photocatalyst function and improving dispersiblity, the hydrocarbon group in the silane compound has preferably 1 to 18 carbon atoms, more preferably 4 to 12 carbon atoms, and particularly preferably 4 to 10 carbon atoms.

Examples of an aluminum compound in which a metal atom of the metal-containing compound is Al and a hydrocarbon group is provided include alkyl aluminate such as triethoxyaluminum, tri-i-propoxyaluminum, and tri-sec-butoxyaiuminum; aluminum chelate such as di-i-propoxy-mono-sec-butoxyaluminum, and di-i-propoxyaluminumethylacetoacetate; and an aluminum coupling agent such as acetoalkoxyaluminum diisopropylate.

(Characteristics of Titanium Oxide Particle)

The titanium oxide particle according to the exemplary embodiment absorbs light having wavelengths of 450 nm and 750 nm in a visible absorption spectrum.

From a viewpoint of showing a high photocatalyst function even in the visible light region, it is preferable that the titanium oxide particle according to the exemplary embodiment absorbs light having wavelengths of 450 nm, 600 nm, and 750 nm in the visible absorption spectrum. It is more preferable that the titanium oxide particle absorbs light having a range of a wavelength of 450 nm to 750 nm in the visible absorption spectrum. It is particularly preferable that the titanium oxide particle absorbs light having a range of a wavelength of 400 nm to 800 nm in the visible absorption spectrum.

Regarding the titanium oxide particle, from a viewpoint of showing a high photocatalyst function even in the visible light region, in the visible absorption spectrum, when absorbance at a wavelength of 350 nm is set to 1, the absorbance at a wavelength of 450 nm is preferably equal to or more than 0.02 (preferably equal to or more than 0.1). In addition, it is more preferable that absorbance at a wavelength of 450 nm is equal to or more than 0.2 (preferably equal to or more than 0.3), and absorbance at a wavelength of 750 nm is equal to or more than 0.02 (preferably equal to or more than 0.1).

The visible absorption spectrum is measured by a method as follows. Firstly, measurement as performed on a titanium oxide particle which is a measurement target in a range of a wavelength of 200 nm to 900 nm by using a spectrophotometer (U-4100 manufactured by Hitachi High-Technologies Corporation) [measurement under measurement conditions; a scan speed of 600 nm, a slit width of 2 nm, and a sampling interval of 1 nm], thereby, a visible absorption spectrum is obtained. This measurement may be performed on a thin-film sample obtained by formation of particles.

Regarding the titanium oxide particle according to the exemplary embodiment, the M/Ti element ratio with respect to the surface is 0.1 to 0.4, and the C/Ti element ratio with respect to the surface is 0.3 to 1.2.

Specifically, for example, from a viewpoint, of showing a high photocatalyst function even in the visible light region, the titanium oxide particle has an M/Ti element ratio with respect to the surface, which is preferably 0.15 to 0.36, and more preferably 0.17 to 0.33.

From a viewpoint of showing a high photocatalyst function even in the visible light region, the titanium oxide particle has a C/Ti element ratio with respect to the surface, which is preferably 0.4 to 1.1, more preferably 0.5 to 1.0, and particularly preferably 0.6 to 0.9.

From a viewpoint of showing a high photocatalyst function even in the visible light region, regarding the surface of the titanium oxide particle, the element ratio O/(M+Ti) is preferably 2.05 to 2.5, more preferably 2.1 to 2.45, and further preferably 2.15 to 2.4.

In a general titanium oxide particle subjected to surface treatment with a metal-containing compound having a hydrocarbon group, the value of a relation O/(M+Ti) between oxygen O and an element ratio of the metal H and titanium represents 2.0 or a value which is slightly lower than 2.0. However, the titanium oxide particle according to the exemplary embodiment has a strong tendency that the value of O/(M+Ti) with respect to the surface of the titanium oxide particle is 2.05 to 2.5. It is considered that this means that hydrocarbon groups on the surface of titanium oxide particles are adequately carbonized. Thus, the titanium oxide particle sufficiently absorbs light having wavelengths of 450 nm and 750 nm, and shows a high photocatalyst function in the visible light region.

If the value of the O/(M+Ti) element ratio is equal to or more than 2.05, the hydrocarbon groups on the surface of the titanium oxide particles are sufficiently carbonized, and high absorption at wavelengths of 450 nm and 750 nm is obtained. In addition, the photocatalyst function is sufficiently shown in the visible light region. If the value of the O/(M+Ti) element ratio is equal to or less than 2.5, the number of O atoms is adequately provided on the surface of the titanium oxide particle. Thus, an exposed amount of a portion at which titanium oxide is activated on the surface of the titanium oxide particle is sufficient, and the photocatalyst function is sufficiently shown in the visible light region.

The M/Ti element ratio, the C/Ti element ratio, and the value of O/(M+Ti) on the surface of the titanium oxide particle are measured by a method as follows. Firstly, measurement is performed on a titanium oxide particle which is a measurement target. The measurement is performed by using an X-ray photoelectron spectroscopy (XPS) analyzer (JPS-9000MX manufactured by JEOL Corp.) under conditions that a MgKα beam is used as an X-ray source, an acceleration voltage is set to 10 kV, and an emission current is set to 20 mA. The M/Ti element ratio, the C/Ti element ratio, and the value of O/(M+Ti) are calculated from intensity of a peak of each element.

The volume average particle diameter of titanium oxide particles according to the exemplary embodiment is preferably 10 nm to 1 µm, more preferably 10 nm to 200 nm, and further preferably 15 nm to 200 nm.

If the volume average particle diameter of the titanium oxide particles is equal to or more than 10 nm, aggregation of the titanium oxide particles is difficult, and the photocatalyst function is easily highly shown. If the volume average particle diameter of the titanium oxide particles is set to be equal to or less than 1 µm, a percentage of a specific surface area to an amount is increased, and the photocatalyst function is easily highly shown. Thus, if the volume average particle diameter of the titanium oxide particles is set to be in the above range, a high photocatalyst function is easily shown in the visible light region.

The volume average particle diameter of the titanium oxide particles is measured by NANOTRACK UPA-ST (a dynamic light scattering type particle diameter measuring device manufactured by Microtrac Bel). Regarding a measurement condition, the concentration of a sample is set to be 20%, and a measurement period is set to be 300 seconds. This device measures a particle diameter by using a Brownian motion in dispersoid. The device irradiates a solution with a laser beam, and detects scattered light, so as to measure a particle diameter.

Cumulative distribution of a volume of each particle from a small particle diameter side, in a divided particle diameter range (channel) is drawn based on particle diameter distribution which is measured by a dynamic light scattering type particle diameter measuring device. Then, a particle diameter causing the accumulation to be 50% is obtained as a volume average particle diameter.

<Preparing Method of Titanium Oxide Particle>

A preparing method of the titanium oxide particle according to the exemplary embodiment is not particularly limited. However, it is preferable that the preparing method includes a process of performing surface treatment on an untreated titanium oxide particle with a metal-containing compound having a hydrocarbon group, and a process of heating the titanium oxide particle during or after the process of performing surface treatment on the untreated titanium oxide particle.

Firstly, surface treatment of an untreated titanium oxide particle with a metal-containing compound will be described.

A method of performing surface treatment on an untreated titanium oxide particle with a metal-containing compound is not particularly limited. For example, a method in which a metal-containing compound itself is brought into contact with an untreated titanium oxide particle, and a method in which a treatment liquid in which the metal-containing compound is dissolved in a solvent is brought into contact with an untreated titanium oxide particle are exemplified. Specifically, for example, a method in which a metal containing compound itself or a treatment liquid is added to a dispersion in which untreated titanium oxide particles are dispersed in a solvent, under stirring, and a method in which addition (dropping, ejecting, and the like) to an untreated titanium oxide particle in a state of flowing by stirring of HENSCHEL MIXER and the like is performed are exemplified.

With the above method, a reactive group (for example, a hydrolyzable group) in the metal-containing compound reacts with a hydrolyzable group (a hydroxyl group, a halogeno croup, an alkoxy group, and the like) provided on the surface of an untreated titanium oxide particle, and thus the surface treatment of the untreated titanium oxide particle with the metal-containing compound is performed.

Here, examples of a solvent for dissolving the metal-containing compound include an organic solvent (for example, a hydrocarbon solvent, an ester solvent, an ether solvent, a halogen solvent, and an alcohol solvent), water, and a solvent mixture thereof.

Examples of the hydrocarbon solvent include toluene, benzene, xylene, hexane, octane, hexadecane, and cyclohexane. Examples of the ester solvent include methyl acetate, ethyl acetate, isopropyl acetate, and amyl acetate. Examples of the ether solvent include dibutyl ether and dibenzyl ether. Examples of the halogen solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol solvent include methanol, ethanol, and i-propyl alcohol. Examples of the water include tap water, distilled water, and pure water.

As the solvent, in addition to the above solvents, a solvent such as dimethylformamide, dimethylacetamide, dimethylsulfoxide, acetic acid, and sulfuric acid may be used, In the treatment liquid in which the metal-containing compound is dissolved in a solvent, the concentration of the metal-containing compound is preferably 0.05 mol/L to 500 mol/L, and more preferably 0.5 mol to 10 mol/L.

Regarding the condition for surface treatment of a titanium oxide particle with the metal-containing compound, from a viewpoint of showing a high photocatalyst function and improving dispersiblity, the following conditions may be provided. An untreated titanium oxide particle may be subjected to surface treatment with a metal-containing compound which is 10% by weight to 100% by weight (preferably, 20% by weight to 75% by weight, and more preferably 25% by weight to 50% by weight) with respect to the untreated titanium oxide particle. If the treated amount of the metal-containing compound is set to be equal to or more than 10% by weight, a high photocatalyst function is easier shown in the visible light region. The dispersibility is also easily improved. If the treated amount of the metal-containing compound is set to be equal to or less than 100% by weight, an occurrence of a situation in which an amount of metal (F) on the surface (Ti—O—) of the titanium oxide particle is excessive is prevented, and deterioration of the photocatalyst function by surplus metal (M) is easily prevented.

The temperature of the surface treatment of an untreated titanium oxide particle with the metal-containing compound is preferably 15° C. to 150° C., and more preferably 20° C. to 100° C. The surface treatment period is preferably 10 minutes to 120 minutes, and more preferably 30 minutes to 90 minutes.

After the surface treatment of an untreated titanium oxide particle with the metal-containing compound, drying treatment, may be performed. A method of the drying treatment, is not particularly limited. For example, a known drying method such as a vacuum drying method and a spray drying method is used. A drying temperature is preferably 20° C. to 150° C.

Next, heating treatment will be described.

The heating treatment as performed in the middle of the process of performing surface treatment on an untreated titanium oxide particle or performed after the process of performing surface treatment on an untreated titanium oxide particle. Specifically, when an untreated titanium oxide particle is surface-treated with the metal-containing compound, when drying treatment after surface treatment is performed, or after drying treatment, the heating treatment may be separately performed. However, because the titanium oxide particle is required to sufficiently react with the metal-containing compound before the heating treatment is performed, when drying treatment after surface treatment is performed or after the drying treatment, the heating treatment is preferably separately performed. It is more preferable that the drying treatment is performed, and then the heating treatment is separately performed in a state where surface treatment and drying of the titanium oxide particle are adequately performed.

From a viewpoint of showing a high photocatalyst function and improving dispersibility, a temperature of the heating treatment is preferably 180° C. to 500° C., more preferably 200° C. to 450° C., and further preferably 250° C. to 400° C.

In a case where heating treatment is performed in the middle of the process of performing surface treatment on an untreated titanium oxide particle, the metal-containing compound is caused to sufficiently react at the temperature of the surface treatment which has been performed ahead, and then, heating treatment is performed at the temperature of the heating treatment. In a case where heating treatment is performed in drying treatment after surface treatment, the temperature of the drying treatment is used as the temperature of the heating treatment.

From a viewpoint of showing a high photocatalyst function and improving dispersibility, a period for the heating treatment is preferably 10 minutes to 300 minutes, and more preferably 30 minutes to 120 minutes.

The method of the heating treatment is not particularly limited. A known heating method, for example, heating by an air furnace, a kiln (roller hearth kiln, shuttle kiln, and the like), a radiant heating furnace, and the like, heating by a laser beam, an infrared ray, UV, a microwave, and the like is used.

With the above processes, the titanium oxide particle according to the exemplary embodiment is appropriately obtained.

<Composition for Forming Photocatalyst>

A composition for forming a photocatalyst according to the exemplary embodiment contains the titanium oxide particle according to the exemplary embodiment and at least one compound selected from the group consisting of a dispersion medium and a binder.

Examples of a form of the composition for forming a photocatalyst according to the exemplary embodiment include a dispersion which contains the titanium oxide particle according to the exemplary embodiment and a dispersion medium, and a composition which contains the titanium oxide particle according to the exemplary embodiment, and an organic or inorganic binder.

The dispersion may have a paste shape having high viscosity.

As the dispersion medium, water, an organic solvent, and the like are preferably used.

Examples of the water include tap water, distilled water, and pure water.

The organic solvent is not particularly limited, and for example, a hydrocarbon solvent, an ester solvent, an ether solvent, a halogen solvent, and an alcohol solvent are exemplified.

From a viewpoint of dispersion stability and storage stability, the dispersion preferably contains at least one type of compound selected from the group consisting of a dispersing agent and a surfactant. As the dispersing agent and the surfactant, well-known materials are used.

The binder used in the composition is not particularly limited. The binder can be, for example, a thermoplastic resin, a thermosetting resin having a siloxane bond, or an inorganic compound. Examples of the binder include fluororesin, silicone resin, polyester resin, acrylic resin, styrene resin, acrylonitrile/styrene copolymer resin, acrylonitrile/butadiene/styrene copolymer (ABS) resin, epoxy resin, polycarbonate resin, polyamide resin, polyamine resin, polyurethane resin, polyether resin, polysulfide resin, polyphenol resin, a compound thereof, an organic binder such as resin obtained by silicone-modifying or halogen-modifying the above resins, and an inorganic binder such as a glass, ceramic, metal powder.

The dispersion may contain the binder in a form of an emulsion.

The composition for forming a photocatalyst according to the exemplary embodiment may contain other components other than the above-described components.

Well-known additives are used as the other components, for example, a promotor, a coloring agent, a fiber, an antiseptic agent, a defoaming agent, an adhesion-enhancing agent, and a thickening agent are exemplified.

The composition for forming a photocatalyst according to the exemplary embodiment may singly contain the titanium oxide particle according to the exemplary embodiment or may contain two types or more of titanium oxide particles.

In the composition for forming a photocatalyst according to the exemplary embodiment, the content of the titanium oxide particle according to the exemplary embodiment is not particularly limited, and may be appropriately selected in accordance with various forms such as a dispersion and a resin composition, and a desired amount of the photocatalyst.

A preparing method of a photocatalyst using the composition for forming a photocatalyst according to the exemplary embodiment, or a preparing method of a structure having the photocatalyst are not particularly limited, and well-known applying methods are used.

Examples of the applying method of the composition for forming a photocatalyst according to the exemplary embodiment include a spin coating method, a dip coating method, a flow coating method, a spray coating method, a roll coating method, a brush coating method, a sponge coating method, a screen printing method, and an ink jet printing method.

<Photocatalyst and Structure>

The photocatalyst according to the exemplary embodiment contains or is formed from the titanium oxide particle according to the exemplary embodiment.

A structure according to the exemplary embodiment contains the titanium oxide particle according to the exemplary embodiment.

The photocatalyst according to the exemplary embodiment may be a photocatalyst formed from only the titanium oxide particle according to the exemplary embodiment, be a photocatalyst obtained by mixing a promotor to the titanium oxide particle according to the exemplary embodiment, and be a photocatalyst obtaining by fixing the titanium oxide particle according to the exemplary embodiment to a desired shape by using an adhesive or a pressure-sensitive adhesive.

From a viewpoint of photocatalyst activation, the structure according to the exemplary embodiment preferably has at least the titanium oxide particle according to the exemplary embodiment, on the surface.

The structure according to the exemplary embodiment preferably has the titanium oxide particle according to the exemplary embodiment, as a photocatalyst.

The structure according to the exemplary embodiment is preferably a structure in which at least the titanium oxide particle according to the exemplary embodiment is provided at at least a portion of the surface of a base, and is preferably a structure formed by applying the composition for forming a photocatalyst according to the exemplary embodiment, to at least a portion of the surface of the base material.

In the structure, the amount of the applied composition for forming a photocatalyst according to the exemplary embodiment is not particularly limited, and may be selected in accordance with a desire.

Further, in the structure according to the exemplary embodiment, the titanium oxide particle according to the exemplary embodiment may be adhered or fixed to the surface of the base material. However, from a viewpoint of durability of the photocatalyst, the titanium oxide particle is preferably fixed to the surface of the base material. A fixing method is not particularly limited, and well-known fixing methods are used.

As a base material used in the exemplary embodiment, various materials are exemplified regardless of an inorganic material and an organic material. The shape of the base material is also not limited.

Preferable examples of the base material include metal, ceramic, glass, plastic, rubber, stone, cement, concrete, textile, fabric, wood, paper, and combination thereof, a stacked member, and an object having at least one coated film on the surface thereof.

Examples of the base material which is preferable from a viewpoint of a use include a building material, an exterior material, a window frame, window glass, a mirror, a table, dishes, a curtain, lens, a prism, exterior and painting of a vehicle, exterior of a mechanical device or a product, a dustproof cover and painting, a traffic sign, various display devices, an advertising tower, a sound insulation wall for road, a sound insulation wall for railway, a bridge, exterior and painting of a guard rail, interior and painting of a tunnel, an insulator, a solar cell cover, a solar water heater collector cover, a polymer film, a polymer sheet, a filter, an indoor signboard, an outdoor signboard, a vehicle lighting lamp cover, an outdoor lighting equipment, an air purifier, a water purifier, medical equipment, and a nursing care product.

EXAMPLES

The present invention will be more specifically described by using examples. However, the examples do not limit the present invention. "Apart" or "%" indicates a weight basis as long as particular statement is not made.

Example 1

40% by weight of isobutyltrimethoxysilane with respect to the not-treated titanium oxide particles is dropped into a dispersion in which a commercial anatase type titanium oxide particle ("SSP-20 (manufactured by Sakai Chemical industry Co., Ltd.)", volume average particle diameter of 12 nm) is dispersed in methanol, so as to cause reaction at 60° C. for one hour. Then, ejection and drying is performed at an outer port temperature of 120° C., thereby dry powder is obtained. Heating treatment is performed on the obtained dry powder in an electric furnace at 400° C. for one hour, and thus a titanium oxide particle 1 is obtained.

Example 2

A titanium oxide particle 2 is obtained in the same manner as in Example 1 except that isobutyltrimethoxysilane in Example 1 is changed to hexyltrimethoxysilane.

Example 3

A titanium oxide particle 3 is obtained in the same manner as in Example 1 except that isobutyltrimethoxysilane in Example 1 is changed to decyltrimethoxysilane.

Example 4

A titanium oxide particle 4 is obtained in the same manner as in Example 2 except that an added amount of hexyltrimethoxysilane in Example 2 is changed from 40 parts to 50 parts.

Example 5

A titanium oxide particle 5 is obtained in the same manner as in Example 2 except that the temperature in the electric furnace when dried particulate powder in Example 2 is heated is changed from 400° C. to 250° C.

Example 6

A titanium oxide particle 6 is obtained in the same manner as in Example 1 except that the temperature in the electric furnace when dried particulate powder in Example 1 is heated is changed from 400° C. to 500° C.

Example 7

A titanium oxide particle 7 is obtained in the same manner as in Example 2 except that an added amount of hexyltrimethoxysilane in Example 2 is changed from 40 parts to 25 parts.

Example 8

A titanium oxide particle 8 is obtained in the same manner as in Example 2 except that an added amount of hexyltrimethoxysilane in Example 2 is changed from 40 parts to 75 parts.

Example 9

A titanium oxide particle 9 is obtained in the same manner as in Example 2 except that the anatase type titanium oxide particle in Example 2 is changed to commercial rutile type titanium oxide particle ("STR-100N (manufactured by Sakai Chemical Industry Co., Ltd.)", volume average particle diameter of 16 nm).

Example 10

A titanium oxide particle 10 is obtained in the same manner as in Example 2 except that the anatase type titanium oxide particle in Example 2 is changed to an anatase type titanium oxide particle (volume average particle diameter of 80 nm) prepared by a sol-gel method.

Example 11

A titanium oxide particle 11 is obtained in the same manner as in Example 2 except that an added amount of hexyltrimethoxysilane in Example 2 is changed from 40 parts to 10 parts.

Example 12

A titanium oxide particle 12 is obtained in the same manner as in Example 1 except that isobutyltrimethoxysilane in Example 1 is changed to methyltrimethoxysilane.

Example 13

A titanium oxide particle 13 is obtained in the same manner as in Example 1 except that isobutyltrimethoxysilane in Example 1 is changed to hexamethyldisilazane.

Example 14

A titanium oxide particle 14 is obtained in the same manner as in Example 1 except that 40 parts of isobutyltrimethoxysilane as a surface treatment agent in Example 1 are changed to 30 parts of dodecyltrimethoxysilane.

Example 15

A titanium oxide particle 15 is obtained in the same manner as in Example 1 except that isobutyltrimethoxysilane in Example 1 is changed to phenyltrimethoxysilane.

Example 16

A titanium oxide particle 16 is obtained in the same manner as in Example 2 except that the temperature in the electric furnace when dried particulate powder is heated in Example 2 is changed from 400° C. to 180° C.

Example 17

A titanium oxide particle 17 is obtained in the same manner as in Example 2 except that the anatase type titanium oxide particle in Example 2 is changed to an anatase type titanium oxide particle (volume average particle diameter of 200 nm) prepared by a sol-gel method.

Example 18

A titanium oxide particle 18 is obtained in the same manner as in Example 2 except that the anatase type titanium oxide particle in Example 2 is changed to an anatase type titanium oxide particle (volume average particle diameter of 800 nm) prepared by a sol-gel method.

Example 19

A titanium oxide particle 19 is obtained in the same manner as in Example 1 except that isobutyltrimethoxysilane in Example 1 is changed to acetoalkoxyaluminum diisopropylate (AL-M, manufactured by Ajinomoto Co., Inc., an alkoxy group in acetoalkoxy is an oxadecyloxy group).

Comparative Example 1

A commercial anatase type titanium oxide particle ("SSP-20 (manufactured by Sakai Chemical Industry Co., Ltd.", volume average particle diameter of 12 nm)) itself is used as a titanium oxide particle C1.

Comparative Example 2

A commercial rutile type titanium oxide particle ("STR-1008 (manufactured by Sakai Chemical Industry Co., Ltd.", volume average particle diameter of 16 nm)) itself is used as a titanium oxide particle C2.

Comparative Example 3

The commercial anatase type titanium oxide particle ("SSP-20 (manufactured by Sakai Chemical Industry Co., Ltd.", volume average particle diameter of 12 nm)) is heated at 400° C. in an electric furnace for one hour, thereby a titanium, oxide particle C3 is obtained.

Comparative Example 4

The commercial rutile type titanium oxide particle ("STR-100N (manufactured by Sakai Chemical Industry Co., Ltd.", volume average particle diameter of 16 nm)) is heated at 400° C. in an electric furnace for one hour, thereby a titanium oxide particle C4 is obtained.

Comparative Example 5

A titanium oxide particle C5 is obtained in the same manner as in Example 1 except that an added amount of isobutyltrimethoxysilane in Example 1 is changed from 40 parts to 5 parts.

Comparative Example 6

A titanium oxide particle C6 is obtained in the same manner as in Example 1 except that an added amount of isobutyltrimethoxysilane in Example 1 is changed from 40 parts to 120 parts.

Comparative Example 7

A titanium oxide particle C7 is obtained in the same manner as in Example 1 except that the temperature in the electric furnace when dried particulate powder in Example 1 is heated is chanced from 400° C. to 600° C.

Comparative Example 8

A titanium oxide particle C8 is obtained in the same manner as in Example 1 except that the temperature in the electric furnace when dried particulate powder in Example 1 is heated is changed from 400° C. to 160° C.

Comparative Example 9

A titanium oxide particle C9 is obtained in the same manner as in Example 1 except that dried particulate powder in Example 1 is not heated.

<Measurement>

Regarding particles obtained in the examples, absorption spectrum characteristics are confirmed. The particles in Examples 1 to 19 and Comparative Examples 5 to 7 absorb light in a range of a wavelength of 400 nm to 800 nm. Items marked as "UV-Vis characteristics" in Tables 1 and 2 indicate absorbance of a wavelength of 450 nm, a wavelength of 600 nm, and a wavelength of 750 nm, respectively, when absorbance of a wavelength of 350 nm is set to 1. The M/Ti element ratio, the C/Ti element ratio, and the value of O/(M+Ti) on the surface of the particle by XPS, and the volume average particle diameter (in Table, marked as "D50v") are measured in accordance with the above-described methods.

<Evaluation>

(Decomposing Ability (Photocatalyst Activation))

Decomposing ability is evaluated as photocatalyst characteristics in the visible light region.

Regarding evaluation of the decomposing ability, evaluation is performed by using decomposition (chromaticity variation) of a fountain pen ink (INK-30-R manufactured by Pilot Corporation). Specifically, the particles obtained in each of the examples are dispersed in pure water containing 4 parts by weight of methanol, so as to cause the solid concentration to be 2 parts by weight. Then, the dispersion is ejected and applied onto a tile (5 cm square). Then, the tile is dried, and thus sample particles are uniformly adhered to the surface of the tile.

Then, a diluted ink obtained in a manner that a fountain pen ink is diluted and prepared 15 times in a liquid mixture of methanol and pure water (methanol:pure water=3:5) is ejected and applied onto the surface thereof. Then, the tile is dried, and thus a sample piece is prepared.

A test piece just after the test piece is prepared is continuously irradiated with visible light (10,000 LX (LUX)) for two hours by using a light emitting diode (LED) which performs irradiation with visible light having a wavelength of 400 nm to 800 nm (an absorption wavelength region (wavelength of 450 nm to 550 nm) of the ink is cut by a filter). At this time, a 5-yen coin is disposed at the center portion of the irradiated surface of the test piece, and thus a blocked portion of irradiation is formed.

Just after the test piece is prepared, hue of the test piece after irradiation with visible light for two hours is measured by a spectral color difference meter "RM200QC (manufactured by X-Rite Inc.)", and $\Delta E1$ and $\Delta E2$ calculated by the following expression are obtained.

Chromaticity B is a value calculated by an expression of $E=\{(L^*)^2+(a^*)^2+(b^*)^2\}^{0.5}$. Each of $L^*$, $a^*$, and $b^*$ represents a value based on an $L^*a^*b^*$ color system.

$\Delta E1$=(chromaticity of the irradiated surface after continuous irradiation with visible light for two hours)−(chromaticity of the surface of a test piece just after the test piece is prepared)  Expression:

ΔE2=(chromaticity of the blocked surface of the irradiation after continuous irradiation with visible light for two hours)−(chromaticity of the surface of the test piece just after the test piece is prepared)   Expression: 5

Thus, decomposing ability is evaluated based on a decoloring variation value ΔE=ΔE1−ΔE2. Evaluation criteria are as follows.

—Evaluation Criteria of Decomposing Ability—
A: 25%≤ΔE
B: 10%≤ΔE<25%
C. ΔE<10%
(Dispersibility)

The dispersibility is evaluated as follows. 0.05 g of particles obtained in each of the examples is put into a beaker, and 40 g of methyl ethyl ketone is added. Then, particle diameter distribution after dispersing is performed for 10 minutes in an ultrasonic dispersion machine is measured by NANOTRACK UPA-ST (a dynamic light scattering type particle diameter measuring device manufactured by Microtrac Bel). Thus, evaluation is performed by distribution form of volume particle diameter distribution. Evaluation criteria are as follows.

—Evaluation Criteria of Dispersibility—
A: one peak value in the volume particle diameter distribution is provided, and dispersibility is good
B: two peak values in the volume particle diameter distribution are provided, but the main peak value is equal to or more than 10 times the other peak value. Thus, actually, there is no problem in dispersibility.
C: three peak values or more in the volume particle diameter distribution are provided, and dispersibility is poor.

Tables 1 and 2 show a list of the details and evaluation results of each of the examples.

TABLE 1

| | Material of titanium oxide particle | Metal-containing compound | | | | Uv-Vis characteristics | | |
| --- | --- | --- | --- | --- | --- | --- | --- | --- |
| | | Type | M | Added amount (weight %) | Heating temperature | Absorbance of wavelength of 450 nm | Absorbance of wavelength of 600 nm | Absorbance of wavelength of 750 nm |
| Example 1 | anatase type | isobutyl | Si | 40 | 400° C. | 0.42 | 0.31 | 0.21 |
| Example 2 | anatase type | hexyl | Si | 40 | 400° C. | 0.58 | 0.42 | 0.26 |
| Example 3 | anatase type | decyl | Si | 40 | 400° C. | 0.56 | 0.40 | 0.25 |
| Example 4 | anatase type | hexyl | Si | 50 | 400° C. | 0.60 | 0.46 | 0.29 |
| Example 5 | anatase type | hexyl | Si | 40 | 250° C. | 0.24 | 0.16 | 0.07 |
| Example 6 | anatase type | hexyl | Si | 40 | 500° C. | 0.35 | 0.25 | 0.13 |
| Example 7 | anatase type | hexyl | Si | 25 | 400° C. | 0.30 | 0.21 | 0.11 |
| Example 8 | anatase type | hexyl | Si | 75 | 400° C. | 0.59 | 0.43 | 0.25 |
| Example 9 | rutile type | hexyl | Si | 40 | 400° C. | 0.60 | 0.44 | 0.28 |
| Example 10 | sol-gel method | hexyl | Si | 40 | 400° C. | 0.56 | 0.40 | 0.26 |
| Example 11 | anatase type | hexyl | Si | 10 | 400° C. | 0.12 | 0.08 | 0.02 |
| Example 12 | anatase type | methyl | Si | 40 | 400° C. | 0.31 | 0.23 | 0.13 |
| Example 13 | anatase type | HMDS | Si | 40 | 400° C. | 0.33 | 0.24 | 0.14 |
| Example 14 | anatase type | dodecyl | Si | 30 | 400° C. | 0.55 | 0.38 | 0.23 |
| Example 15 | anatase type | phenyl | Si | 40 | 400° C. | 0.25 | 0.19 | 0.11 |
| Example 16 | anatase type | hexyl | Si | 40 | 180° C. | 0.18 | 0.13 | 0.08 |
| Example 17 | sol-gel method | hexyl | Si | 40 | 400° C. | 0.55 | 0.40 | 0.24 |
| Example 18 | anatase type | hexyl | Si | 40 | 400° C. | 0.50 | 0.35 | 0.21 |
| Example 19 | anatase type | $C_{18}H_{35}$ | Al | 40 | 400° C. | 0.32 | 0.23 | 0.12 |

| | XPS | | | | Evaluation | |
| --- | --- | --- | --- | --- | --- | --- |
| | M/Ti element ratio | C/Ti element ratio | Value of O/(M + Ti) element ratio | D50v (μm) | Decomposing ability | Dispersibility |
| Example 1 | 0.25 | 0.95 | 2.24 | 12 | A | A |
| Example 2 | 0.24 | 0.86 | 2.15 | 12 | A | A |
| Example 3 | 0.32 | 1.05 | 2.20 | 12 | A | A |
| Example 4 | 0.24 | 0.86 | 2.15 | 12 | A | A |
| Example 5 | 0.32 | 1.16 | 2.12 | 12 | A | A |
| Example 6 | 0.22 | 0.48 | 2.18 | 12 | B | A |
| Example 7 | 0.17 | 0.58 | 2.07 | 12 | A | A |
| Example 8 | 0.37 | 1.16 | 2.08 | 12 | A | A |
| Example 9 | 0.25 | 0.95 | 2.24 | 16 | A | A |
| Example 10 | 0.25 | 0.95 | 2.24 | 80 | A | A |
| Example 11 | 0.12 | 0.35 | 2.14 | 12 | B | A |
| Example 12 | 0.24 | 0.86 | 2.15 | 12 | B | A |
| Example 13 | 0.30 | 0.90 | 2.15 | 12 | B | A |
| Example 14 | 0.32 | 0.79 | 2.40 | 12 | B | A |
| Example 15 | 0.26 | 1.16 | 2.25 | 12 | B | B |
| Example 16 | 0.32 | 1.18 | 2.10 | 12 | B | A |
| Example 17 | 0.24 | 0.86 | 2.15 | 200 | A | A |
| Example 18 | 0.32 | 0.74 | 2.44 | 800 | A | A |
| Example 19 | 0.23 | 0.88 | 2.25 | 12 | B | B |

TABLE 2

| | Material of titanium oxide particle | Metal-containing compound | | | | Uv-Vis characteristics | | |
|---|---|---|---|---|---|---|---|---|
| | | Type | M | Added amount (weight %) | Heating temperature | Absorbance of wavelength of 450 nm | Absorbance of wavelength of 600 nm | Absorbance of wavelength of 750 nm |
| Comparative Example 1 | anatase type | none | none | none | none | 0 | 0 | 0 |
| Comparative Example 2 | rutile type | none | none | none | none | 0 | 0 | 0 |
| Comparative Example 3 | anatase type | none | none | none | 400° C. | 0 | 0 | 0 |
| Comparative Example 4 | rutile type | none | none | none | 400° C. | 0 | 0 | 0 |
| Comparative Example 5 | anatase type | isobutyl | 5 | 5 | 400° C. | 0.02 | 0.01 | 0.01 |
| Comparative Example 6 | anatase type | isobutyl | 120 | 120 | 400° C. | 0.60 | 0.42 | 0.26 |
| Comparative Example 7 | anatase type | isobutyl | 40 | 40 | 600° C. | 0.06 | 0.04 | 0.01 |
| Comparative Example 8 | anatase type | isobutyl | 40 | 40 | 160° C. | 0.01 | 0 | 0 |
| Comparative Example 9 | anatase type | isobutyl | 40 | 40 | none | 0 | 0 | 0 |

| | XPS | | | | Evaluation | |
|---|---|---|---|---|---|---|
| | M/Ti element ratio | C/Ti element ratio | Value of O/(M + Ti) element ratio | D50v (μm) | Decomposing ability | Dispersibility |
| Comparative Example 1 | 0 | 0.19 | 2.03 | 12 | C | C |
| Comparative Example 2 | 0 | 0.19 | 1.94 | 16 | C | C |
| Comparative Example 3 | 0 | 0.16 | 1.97 | 12 | C | C |
| Comparative Example 4 | 0 | 0.16 | 2.06 | 16 | C | C |
| Comparative Example 5 | 0.03 | 0.19 | 1.85 | 12 | C | C |
| Comparative Example 6 | 0.47 | 1.53 | 1.96 | 12 | C | B |
| Comparative Example 7 | 0.08 | 0.25 | 2.62 | 12 | C | C |
| Comparative Example 8 | 0.32 | 1.32 | 2.00 | 12 | C | A |
| Comparative Example 9 | 0.33 | 1.50 | 2.04 | 12 | C | A |

It is understood that the examples have decomposing ability better than that in the comparative examples, from the above results. Thus, it is understood that the examples show a high photocatalyst function even in the visible light region in comparison to the comparative examples. It is understood that the examples also secure dispersibility.

The foregoing description of the exemplary embodiments of the present invention has been provided for the purposes of illustration and description. It is not intended to be exhaustive or to limit the invention to the precise forms disclosed. Obviously many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A titanium oxide particle comprising bonded thereon a metal-containing compound which has a hydrocarbon group,
    wherein the titanium oxide particle has an absorption at 450 nm and 750 nm in a visible absorption spectrum,
    with respect to a surface of the particle, an element ratio M/Ti between metal M of the metal-containing compound and titanium is from 0.1 to 0.4 and an element ratio C/Ti between carbon C and titanium is from 0.3 to 1.2, and
    the titanium oxide particle comprises carbon obtained by carbonizing the hydrocarbon group.
2. The titanium oxide particle according to claim 1,
    wherein the titanium oxide particle is any one of a brookite type, an anatase type, and a rutile type.
3. The titanium oxide particle according to claim 1,
    which has an absorption in a range of a wavelength of 400 nm to 800 nm in the visible absorption spectrum.
4. The titanium oxide particle according to claim 1,
    wherein an element ratio O/(M+Ti) between oxygen O and a total of the metal M and titanium with respect to the surface of the particle is from 2.05 to 2.5.

5. The titanium oxide particle according to claim 1, wherein the metal of the metal-containing compound is silicon.

6. The titanium oxide particle according to claim 1, wherein the metal-containing compound which has a hydrocarbon group is a compound represented by $R^1{}_n MR^2{}_m$ wherein $R^1$ represents an aliphatic hydrocarbon group or an aromatic hydrocarbon group, which is saturated or unsaturated and has 1 to 20 carbon atoms, $R^2$ represents a halogen atom or an alkoxy group, n represents an integer of 1 to 3, and m represents an integer of 1 to 3, provided that n+m=4 is satisfied, in a case where n represents an integer of 2 or 3, plural $R^1$ may be the same or different, and in a case where m represents an integer of 2 or 3, plural $R^2$ may be the same or different.

7. The titanium oxide particle according to claim 1, wherein the hydrocarbon group is a saturated aliphatic hydrocarbon group.

8. The titanium oxide particle according to claim 7, wherein the number of carbon atoms of the saturated aliphatic hydrocarbon group is from 4 to 10.

9. The titanium oxide particle according to claim 1, which has a volume average particle diameter of from 10 nm to 1 μm.

10. The titanium oxide particle according to claim 1, wherein the titanium oxide particle contains a pore, and the carbon obtained by carbonizing the hydrocarbon group is in the pore.

11. A composition for forming a photocatalyst, comprising:
the titanium oxide particle according to claim 1; and
at least one compound selected from the group consisting of a dispersion medium and a binder.

12. The composition for forming a photocatalyst according to claim 11, wherein the dispersion medium contains water.

13. The composition for forming a photocatalyst according to claim 11, wherein the binder is a thermoplastic resin.

14. The composition for forming a photocatalyst according to claim 11, wherein the binder is a thermosetting resin having a siloxane bond.

15. The composition for forming a photocatalyst according to claim 11, wherein the binder is an inorganic compound.

16. A photocatalyst comprising the titanium oxide particle according to claim 1.

17. The photocatalyst according to claim 16, further comprising a promotor.

18. The photocatalyst according to claim 16, further comprising an adhesive.

19. The photocatalyst according to claim 16, further comprising a pressure-sensitive adhesive.

* * * * *